(No Model.)  2 Sheets—Sheet 1.
H. TEN WINKEL.
APPARATUS FOR UTILIZING EXHAUST STEAM.
No. 565,866. Patented Aug. 11, 1896.
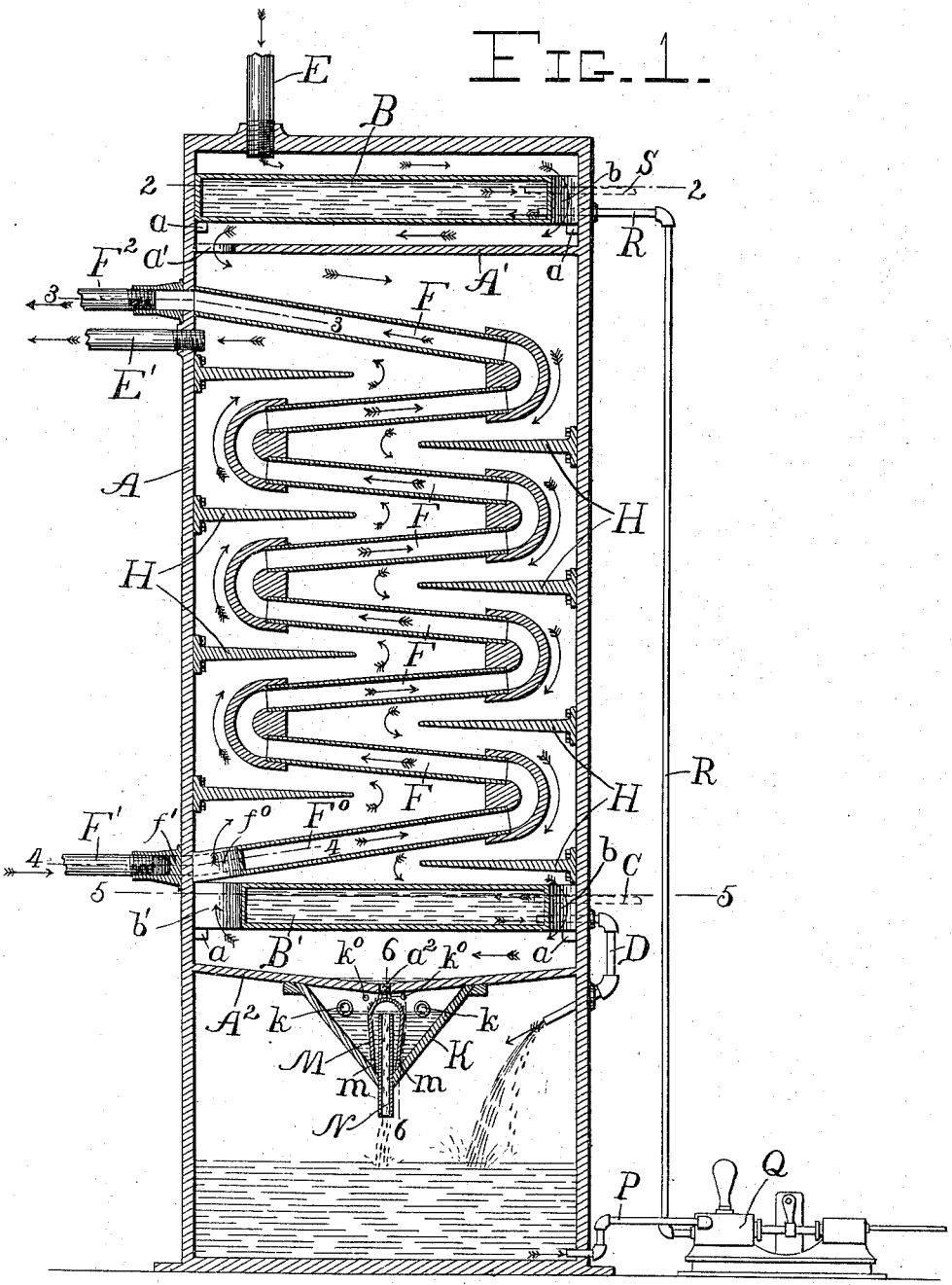

(No Model.)　　　　　H. TEN WINKEL.　　　2 Sheets—Sheet 2.
APPARATUS FOR UTILIZING EXHAUST STEAM.
No. 565,866.　　　　　　　Patented Aug. 11, 1896.
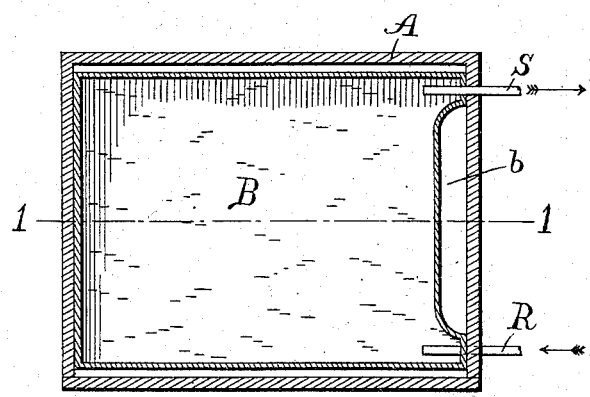
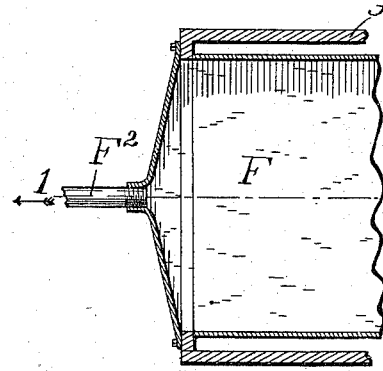
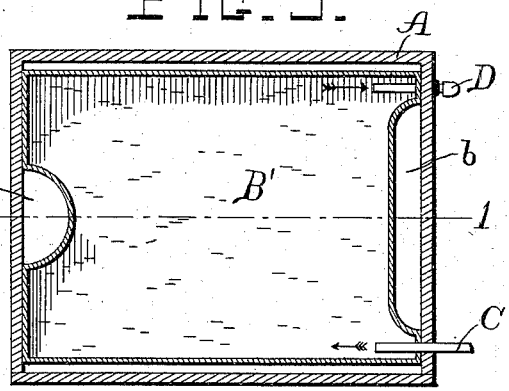
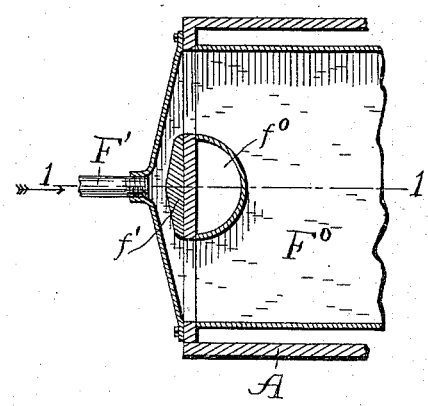
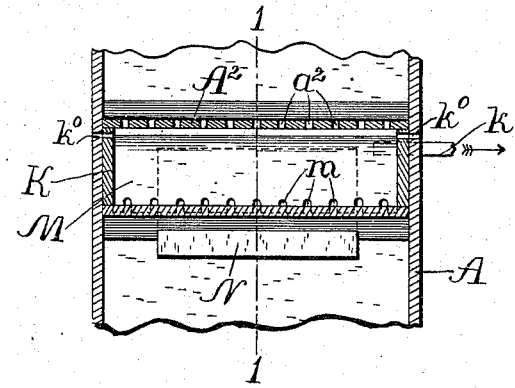
Witnesses
D. H. Blakelock.
John C. Wilson.
Inventor
Herman Ten Winkel,
by Whitman & Wilkinson,
Attorneys.

UNITED STATES PATENT OFFICE.

HERMAN TEN WINKEL, OF DENVER, COLORADO.

APPARATUS FOR UTILIZING EXHAUST-STEAM.

SPECIFICATION forming part of Letters Patent No. 565,866, dated August 11, 1896.

Application filed May 26, 1896. Serial No. 593,167. (No model.)

*To all whom it may concern:*

Be it known that I, HERMAN TEN WINKEL, a citizen of the United States, residing at Denver, in the county of Arapahoe and State of Colorado, have invented certain new and useful Improvements in Apparatus for Utilizing Exhaust-Steam; and I do hereby declare the following to be a full, clear, and exact description of the invention, such as will enable others skilled in the art to which it appertains to make and use the same.

My invention relates to improvements in apparatus for utilizing exhaust or escaped steam; and it consists of certain novel features hereinafter described and claimed.

Reference is had to the accompanying drawings, in which the same parts are indicated by the same letters throughout the several views.

Figure 1 represents a central vertical section through the apparatus along the line 1 1 of the several other views. Fig. 2 represents a horizontal section along the line 2 2 of Fig. 1. Fig. 3 represents a section along the broken line 3 3 of Fig. 1. Fig. 4 represents a section along the broken line 4 4 of Fig. 1. Fig. 5 represents a section along the line 5 5 of Fig. 1, and Fig. 6 represents a section along the broken line 6 6 of Fig. 1 and looking to the left.

A represents a tank or suitable receptacle, which is divided by the horizontal partition A' and the inclined partition $A^2$ into three chambers, the upper two being connected by the open space $a'$ and the lower being connected by the perforations $a^2$ at the center of the trough-like bottom $A^2$.

In the upper chamber and preferably occupying most of the space thereof is the superheating-chamber B, which rests upon ribs $a$, attached to the walls of the chamber A; or these ribs may be in the form of feet attached to the bottom of the chamber B, if preferred.

Near the bottom of the central chamber I provide a feed-water chamber B', into which water is forced from any suitable source of liquid supply through the pipe C, and from whence the said feed-water is delivered through the pipe D to the lower portion of the chamber A, or the "water-chamber," as it may be called.

In the central chamber I provide a zigzag coil F, the members of which are preferably composed of flat hollow passages connected together with suitable unions and opening at the lower end, as at F', into a pipe for the influx of air, and opened at the upper end, as at $F^2$, into a pipe for the outflow of air. These zigzag passages F fit snugly between the side walls of the chamber A, projecting over the end walls of the said chamber. In the spaces between these zigzag passages are the deflectors H.

The exhaust-steam is carried from the engine or engines, or other source of steam supply, through the pipe E into the upper portion of the chamber A, whence it flows in the direction of the arrows above the superheating-chamber B, down through the opening in the end thereof, as $b$, then through the opening $a'$ into the partition A'. Thence it follows the path of the zigzag passages F, finally passing down through the opening $b$ in the feed-water chamber B', when it returns through the opening $b'$ upward, and, passing through the opening $f'$ in the lower member of the zigzag passages, it follows the path of these zigzag passages upward, finally escaping through the pipe E'. Most of the steam will be condensed in following this zigzag path, and what escapes through the pipe E' will be principally air or steam at lower pressure. The influx of steam through the pipe E will tend to superheat the liquid in the superheating-chamber B and at the same time partially condensing the said steam, and most of the water will be condensed from the steam during its passage from the pipe E to the pipe E', as aforesaid. This pipe E' may open in the air or may be connected to an air-pump, if desired, whereby a partial vacuum may be created in the chamber A.

The purpose of the air passing through the pipes F', F, and $F^2$ is to condense the steam, and, if desired, the hot air which escapes from the pipe $F^2$ may be used in heating buildings or in drying-kilns or for like purposes. Moreover, the direction of the air may be reversed through these zigzag coils F, or instead of forcing air through these coils F water may be forced through the coils and may be then led to the feed-water chamber $b'$ and ultimately carried up into the chamber B, as will be hereinafter described, or the steam may be passed through the zigzag coils and the air through the chamber.

The lower partition $A^2$ in the chamber A is preferably made trough-shaped, sloping toward the center, as shown in Fig. 1, where it is provided with perforations $a^2$, beneath which perforations I provide a chamber K, adapted to extract the oil from the condensed water, which oil is carried from the engine along with the steam, and ordinarily it is very injurious in the feed-water, pitting the boilers and otherwise corroding the same. This oil-extracting chamber K is provided with pipes $k$ for the escape of the oil, with air-inlet $k^0$ to maintain sufficient pressure within the chamber K, with the hood M, closed at the top and provided at the bottom with perforations $m$, and with an outlet N for the condensed water, which outlet projects up into the hood a considerable distance above the perforations $m$.

The condensed water and oil which pass through the perforations $a^2$ fall into the oil-extracting chamber K, where the oil floats on the top of the water and flows out through the pipes $k$, while the pure water passes down through the perforations $m$ up into the hood, and then down through the escape pipe or passage N into the liquid-chamber, where the said condensed water unites with the warm feed-water entering from the pipe D.

The amount of the feed-water entering through the pipe D should be regulated to compensate for the loss of the water from the boiler from leakage from such engines as do not exhaust into the chamber A and from such steam or vapor as escapes from the pipe E′, and ordinarily the amount of such feed-water entering through the pipe D would be limited.

The water in the base of the liquid-chamber, which is quite warm, is pumped by means of the pipe P, the pump Q, and the pipe R into the superheating-chamber B, where it is heated by the higher temperature of the steam entering through the pipe E, and from which chamber it is carried by the pipe S to the boilers, or an inspirator or injector may be used instead of the pump Q.

It will thus be seen that I provide an apparatus in which the oil from the condensed water is entirely removed and in which the fresh feed-water is superheated before being fed to the boiler.

It will be obvious that various modifications of the herein-described apparatus might be made which could be used without departing from the spirit of my invention.

It will be seen, as before stated, that the apparatus might be used not only for furnishing feed-water to the boilers, but also for heating a building or factory or for drying fruit or for drying-kilns or for like purposes.

Having thus described my invention, what I claim, and desire to secure by Letters Patent of the United States, is—

1. In an apparatus for utilizing exhaust-steam, the combination with an inclosing tank or casing having a superheating-chamber in its upper portion with an inlet-pipe for exhaust-steam leading thereto, and an outlet for the steam at one end of the bottom thereof; a larger condensing-chamber beneath said superheating-chamber, with an inwardly-inclined perforated bottom thereto; and a receiving tank or reservoir beneath said condensing-chamber; of a closed tank in said superheating-chamber, having a passage at one end for the circulation of steam around said tank; a zigzag air-flue in said condensing-chamber, having air inlet and outlet pipes leading outside of the inclosing tank; flat horizontal deflectors fixed to the sides of said inclosing tank and projecting inward between the sections of said air-flue; a closed feed-water tank in the lower portion of said condensing-chamber having passages around its ends for the circulation of steam; an oil-separator beneath the perforations in the bottom of said condensing-chamber; an inlet-pipe leading to said feed-water tank; an outlet-pipe leading from said feed-water tank into said receiving-reservoir; means for conveying the water from said receiving-tank to the tank in said superheating-chamber; and an outlet-pipe from said latter tank, substantially as described.

2. In an apparatus for utilizing exhaust-steam, the combination with an inclosing tank or casing having a superheating-chamber in its upper portion with an inlet-pipe for exhaust-steam leading thereto, and an outlet for the steam at one end of the bottom thereof; a larger condensing-chamber beneath said superheating-chamber, with inwardly-inclined perforated bottom thereto; and a receiving tank or reservoir beneath said condensing-chamber; of a closed tank in said superheating-chamber, having a passage at one end for the circulation of steam around said tank; a zigzag air-flue composed of flat hollow sections connected together by suitable unions, in said condensing-chamber, and having air inlet and outlet pipes leading outside said inclosing tank; horizontal deflectors fixed to the sides of the inclosing tank and projecting inward between the sections of said air-flue; a closed feed-water tank in the lower portion of said condensing-chamber having passages around its ends for the circulation of steam; an oil-separator beneath the perforations in the bottom of said condensing-chamber; an inlet-pipe to said feed-water tank; an outlet-pipe from said feed-water tank leading into said receiving-reservoir; means for conveying the water from said receiving-tank to the tank in said superheating-chamber; and an outlet-pipe from said latter tank, substantially as described.

3. In an apparatus for utilizing exhaust-steam, the combination with an inclosing tank or casing having a superheating-chamber in its upper portion with an inlet-pipe for exhaust-steam leading thereto, and an outlet for the steam at one end of the bottom thereof; a larger condensing-chamber beneath said superheating-chamber, with an inwardly-inclined perforated bottom thereto; and a receiving tank or reservoir beneath said condensing-chamber; of a closed tank in said superheating-chamber, having a passage at one end for the circulation of steam around said tank; a zigzag air-flue in said condensing-chamber having air inlet and outlet pipes leading outside said inclosing tank; horizontal deflectors fixed to the sides of the inclosing tank and projecting inward between the sections of said air-flue; a closed feed-water tank in the lower portion of said condensing-chamber having passages around the ends thereof; an oil-separator mounted beneath the perforations in the bottom of said condensing-chamber and consisting of a trough having a water-outlet extending upward in said trough a hood covering said water-outlet and having perforations near the base thereof, and an overflow-pipe in the upper portion of said trough for the oil; an inlet-pipe to said feed-water tank; an outlet-pipe from said feed-water tank leading into said receiving-reservoir; means for conveying the water from said receiving-tank to the tank in the superheating-chamber; and an outlet-pipe from said latter tank, substantially as described.

4. In an apparatus for utilizing exhaust-steam, the combination with an inclosing tank or casing having a superheating-chamber in its upper portion with an inlet-pipe for exhaust-steam leading thereto, and an outlet for the steam at one end of the bottom thereof; a larger condensing-chamber beneath said superheating-chamber, with inwardly-inclined perforated bottom thereto; and a receiving tank or reservoir beneath said condensing-chamber; of a closed tank in said superheating-chamber, having a passage at one end for the circulation of steam around said tank; a zigzag air-flue composed of flat hollow sections connected together by suitable unions, in said condensing-chamber, and having air inlet and outlet pipes leading outside said inclosing tank; horizontal deflectors fixed to the sides of the inclosing tank and projecting inward between the sections of said air-flue; a closed feed-water tank in the lower portion of said condensing-chamber having passages around its ends for the circulation of steam; an oil-separator mounted beneath the perforations in the bottom of said condensing-chamber and consisting of a trough having a water-outlet extending upward in said trough a hood covering said water-outlet and having perforations near the base thereof, and an overflow-pipe in the upper portion of said trough for the oil; an inlet-pipe to feed said feed-water tank; an outlet-pipe from said feed-water tank leading into said receiving-reservoir; means for conveying the water from said receiving-tank to the tank in the superheating-chamber; and an outlet-pipe from said latter tank, substantially as described.

In testimony whereof I affix my signature in presence of two witnesses.

HERMAN TEN WINKEL.

Witnesses:
H. T. E. WENDELL,
JAMES H. THOMAS.